J. M. McDONALD.
BATH TUB FITTING.
APPLICATION FILED FEB. 10, 1911.
1,003,770.
Patented Sept. 19, 1911.
2 SHEETS—SHEET 1.
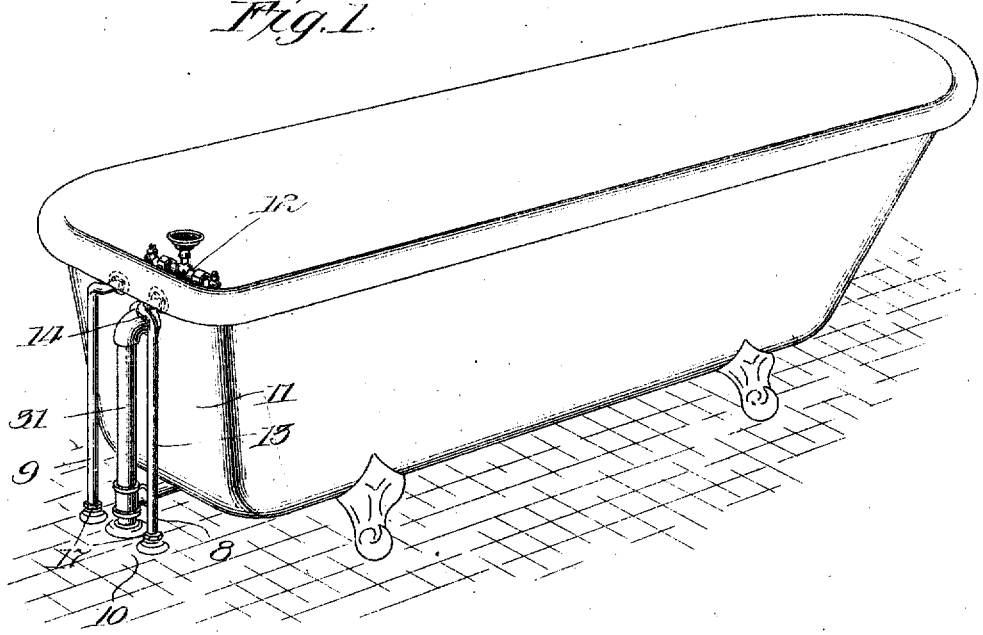
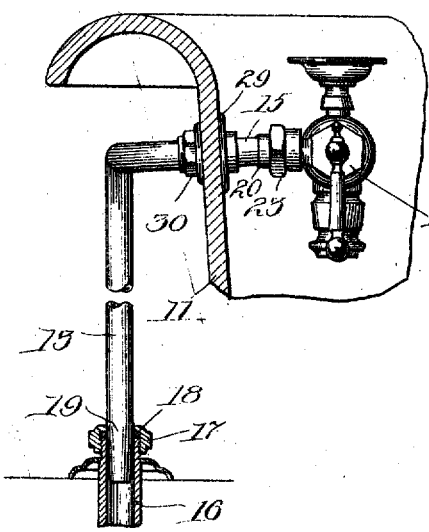
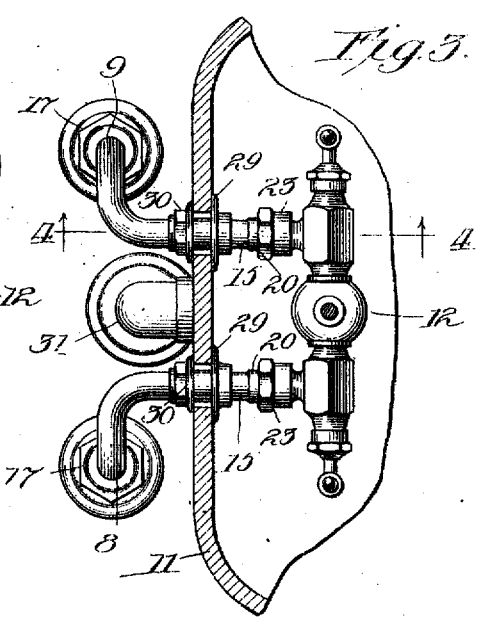

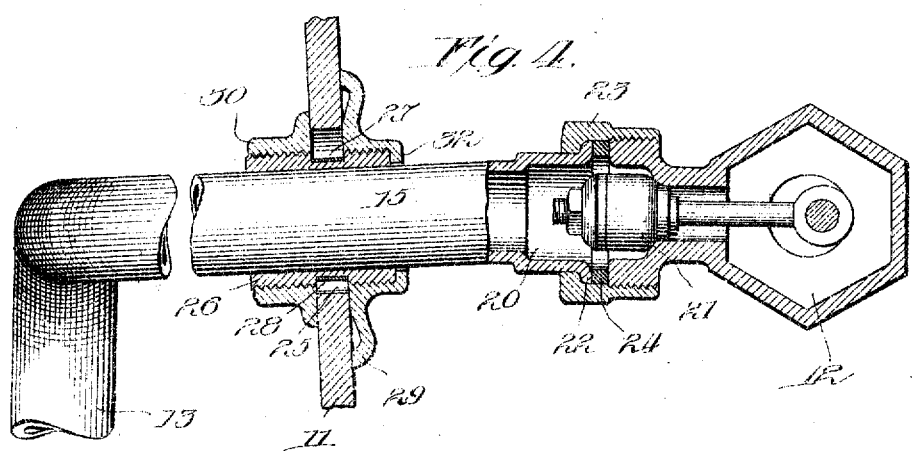

UNITED STATES PATENT OFFICE.

JOHN M. McDONALD, OF DUBUQUE, IOWA, ASSIGNOR TO THE A. Y. McDONALD MFG. CO. A COPARTNERSHIP.

BATH-TUB FITTING 1,003,770. Specification of Letters Patent. Patented Sept. 19, 1911.

Application filed February 10, 1911. Serial No. 607,777.

*To all whom it may concern:*

Be it known that I, JOHN M. MCDONALD, a citizen of the United States, residing at Dubuque, in the county of Dubuque and State of Iowa, have invented certain new and useful Improvements in Bath-Tub Fittings, of which the following is a specification.

This invention relates to a pipe fitting for bath tubs intended for connecting the so-called roughing-in piping, which terminates slightly above the floor level directly with the water cock inside of the bath tub. At the present time, most forms of bath tub fitting for this purpose comprise two portions, namely, the spud, which extends from the cock through the wall of the tub to a point just outside of the same, and a pipe extending from the floor up to and connecting with this spud. I am, however, aware of certain forms of fitting in which these two portions are soldered or welded together, so that for certain purposes, they comprise a single fitting, although they cannot be considered such from all standpoints on account of the soldered or welded connection which has a tendency to become loose and to leak and which on account of the inherent character of the joint may not be tight in the first instance, and which cannot have a strength equal to that of a single pipe fitting made in a single piece.

It will be understood that the present fitting comprises a single piece of pipe or the like, which extends all the way from the roughing-in connection at the floor level up to and through the wall of the tub to the cock inside of the same. This fitting then must be properly designed and formed to make the necessary connection with the roughing-in piping at its lower end. It must be furthermore properly formed at its upper end to make the necessary connection with the water cock and it must be properly formed or associated with other parts to secure the necessary connection with the wall of the tub where it passes through the same.

In order to form the necessary connection with the wall of the tub, it is customary to provide a pair of oppositely disposed nuts or the like, which in all constructions with which I am familiar, thread directly on the pipe to grip the bath tub wall between them. This arrangement is open to a number of objections, among which are the following: In the first place, the spud portion of the pipe is weakened by threading it, because a certain amount of its metal is thus cut away; in the next place, it is necessary to provide a sufficient length of thread to secure a certain amount of horizontal adjustment of the spud portion with respect to the wall of the tub. This adjustment is necessary by reason of the fact that the bath tub is set at a fixed position with respect to the terminal of the roughing-in piping, so that when the fittings are carried up and through the wall of the tub, they must occupy a certain position with respect to the same. In case the tub is shifted backward or forward a small amount, the spud portion will move back and forth through the wall a corresponding amount and the nuts must then be threaded back and forth correspondingly. Consequently, the thread on the spud portion must be long enough to permit of this adjustment and very often a certain portion of this thread is left uncovered on the inside of the tub. This creates an unsightly appearance, and often a great deal of labor and trouble is expended in setting the tub and connecting it up to try and bring the parts into proper relation, so that this thread will not be exposed, although it is not always possible to exactly locate the tub to accomplish this result. At any rate, a considerable loss of time and labor results from this attempted adjustment. A further objection to forming the thread directly upon the spud portion of the pipe fitting is that said portion is in a location difficult of access for the threading operation so that the same is expensive, and often results in a defective thread.

The ordinary water cock fitting which is attached to the spud portion of the pipe fitting is provided with a Fuller ball valve, the ball of which works back and forth by turning the handle of the cock. This ball ordinarily projects from the back end of the cock fitting so that space must be provided in the spud portion of the pipe fitting to accommodate the same and said space must be so large that it will not be obstructed by the Fuller ball a sufficient amount to prevent a proper flow of water. Furthermore, the extreme inside end of the spud portion should be provided with a flange for accommodating the necessary nut which threads onto the water cock to secure the proper connection between the same and the spud portion of the pipe fitting. The end wall of the bath tub is ordinarily given a certain amount of pitch outwardly and upwardly, both to improve the appearance of the tub and to facilitate its manufacture. Consequently, the pipe fitting must be so formed that its spud portion will pass squarely through the same, in order to permit the nuts or the like to set squarely against the wall of the tub. On account of this pitch of the spud portion, the water cocks pitch forwardly a certain amount instead of occupying a perfectly vertical position. This pitch has certain objections and it is desirable to be able to bring the spout and the ring-cup vertical.

Objects of the present invention are to provide a pipe fitting of the class described, which can be made from a single piece of pipe suitably bent to accomplish its necessary function; to so form this pipe as to provide the necessary clearance for the Fuller valve of the water cock; to provide a new and improved means for securing the necessary connection between the spud portion of the fitting and the wall of the tub, where it passes through the same; to accomplish the forementioned connection without in any way weakening the spud portion of the pipe, and in fact, strengthening the same and providing it with additional stiffness and rigidity; to provide means for instantaneously securing the necessary lateral adjustment of said spud portion in the wall of the tub; to provide a connection of such form that no thread will ever be exposed on the inside of the tub, no matter how far in or out the spud portion may be adjusted; to provide a connection at this point such that the pipe fitting proper will be in no wise injured by injury to the threads of the connection by providing a threaded portion which may be placed on the pipe or taken away from the same instantaneously for renewal or replacement; to provide a pipe fitting of such form that if desired the water cock may stand perfectly vertical inside of the tub, regardless of the pitch of the end wall of the same; and in other ways and manners to generally improve the form and construction of such pipe fittings.

Other objects and uses will appear from a detailed description of the invention which consists in the features of construction and combination of parts hereinafter described and claimed.

In the drawings, Figure 1 shows a perspective view of the back portion of a tub provided with my improved pipe fittings; Fig. 2 shows a cross sectional view of a portion of the back of the tub provided with my improved form of fitting, a portion of the vertical leg of the same being broken away for convenience, and the connection between the pipe fitting and the roughing-in piping being in section; Fig. 3 shows a cross section of the end wall of the tub showing the relation of my pipe fittings to the same; Fig. 4 is a vertical cross section taken on the line 4—4 of Fig. 3 showing the parts somewhat in detail and showing particularly the manner of forming the connection between the fitting and the end wall of the tub and the manner in which I form the end of the fitting to permit the water cocks to stand vertical; Fig. 5 shows a detailed side view of the threaded split sleeve; Fig. 6 shows a cross section of the split sleeve on the line 6—6 of Fig. 5 looking in the direction of the arrows; and Fig. 7 shows a somewhat enlarged detail of a modified form of split sleeve connection, specially adapted for securing an unusually tight grip on the pipe at the point where the same passes through the end wall of the tub.

In the embodiment of my invention, I provide a pipe fitting of suitable formation to extend, when desired, all the way from the roughing-in connection near the floor level to the water cock itself inside of the tub. When necessary, but not otherwise, the inner end of this fitting is swelled out a certain amount to provide any necessary clearance for the valve. In order to make the necessary connection with the wall of the tub where the fitting passes through the same, I provide a split sleeve, and thread the same on its outer surface. I then thread the nuts which press against the faces of the wall onto this sleeve, instead of onto the pipe proper. In order to permit the nuts which clamp the wall of the tub to rest flat against the faces of the same I tilt the spud portion upwardly so that it passes through the wall at right angles to the same. Then, in order to permit the water cock to stand perfectly vertical when desired, I bend the inner end of the fitting down a slight amount, so that notwithstanding the fact it may be tilted to exactly right angles to the tub wall at the point where it passes through the same, still it will be horizontal at the point where the cock is attached, thus permitting the latter to stand vertical.

Referring now to the drawings, the fittings 8 and 9 extend from a point near the floor level at 10 up to and through the wall 11 of the tub to make connection with the cock 12. Each of these fittings comprises a vertical portion 13, bent over at right angles in its portion 14, and then inwardly turned in its portion 15, where it passes through the wall of the tub, The customary connection to the roughing-in piping is made in the form of a "slip joint." This is illustrated particularly in Fig. 2. The end of the roughing-in piping is shown at 16. This is threaded on its exterior to receive a cap nut 17, which compresses a gasket 18 against the end portion 19 of the fitting. When necessary, the latter is contracted sufficiently to permit it to slide up and down in the end of the roughing-in piping.

Referring particularly to Fig. 4, it is seen that the spud portion 15 of the fitting is of substantially the same diameter as the rest of the pipe. At its inner end 20, however, it is swelled out sufficiently, when necessary, to provide space for a Fuller ball 21 of the cock so that the latter will not obstruct the flow of water when open. A flange 22 is provided on the extreme end of the fitting, by means of which the necessary connection is established with the cock through the medium of a cap nut 23. A gasket 24 serves to establish a water tight connection.

Obviously, the exact angle at which the cock will stand with respect to the wall 11 of the tub will depend upon the tilt given to the portion 20 of the fitting. Of course, when desired, this portion may continue straight out on the spud portion. However, I have found that it is possible and desirable, in many ways, to expand the end of the pipe, and form the flange 22 thereon by means of dies. When such a process is used, it is a very simple matter to adjust the dies in such a way as to bend the pipe, or form the portion 20 at the necessary angle.

It is customary to provide a hole 25 in the wall of the tub of considerably greater size than that necessary to accommodate a pipe of the ordinary diameter used in the manufacture of fittings. I make use of this fact to great advantage in the construction which I have devised for establishing a firm connection between the spud and the wall of the tub. I provide a split sleeve 26, the halves of which may be adjusted on the spud, even after the fitting has been set onto the tub. This split sleeve is preferably grooved at 27 to receive a spring clamp 28 which assists in holding the two halves together, while the nuts are being threaded onto them, the nuts 29 and 30, which thread onto the split sleeves, serve to grip the end wall of the tub between them. It is found that, when they have been tightened up onto a split sleeve of the type shown in Figs. 4 and 5, a considerable friction will exist between the same and the spud portion 15 of the fitting. Under ordinary circumstances, the combined friction of the split sleeves clamped against the spud portions of the two fittings 8 and 9 by the nuts 29 and 30 is sufficient to hold the cock firmly in position. It is obvious that, in order to secure the necessary preliminary adjustment of the fittings back and forth in the end wall of the tub, the split sleeves need only be moved longitudinally, of the fittings, the necessary amount. This may even be done after the nuts 29 and 30 are threaded onto the sleeves, but before they are tightened. I take advantage of this adjustment feature of the split sleeve in another way. That is, I provide a flange 32 on the inner end of the nut 29 so as to completely hide the split sleeve, thereby always presenting a clean and pleasing appearance on the exposed portion of the fitting and associated parts. As before stated, this cannot be done when the thread is formed directly on the pipe. Ordinarily, it would be customary to thread the nut 29 up as far as possible on the split sleeve, and then secure the clamping effect by tightening the nut 30.

In case it is desired to secure an unusually tight grip on the spud portion of the fitting, this can be accomplished by tapering the thread 33 on one end of the split sleeve, as shown in Fig. 7. Then when the nut 30 is tightened up, the split sleeve will be clamped down against the fitting.

I desire particularly to emphasize the advantages which accrue from the use of the split sleeve construction in the present case. In the first place, the pipe is not weakened by having some of its metal cut away in the threading process, but, on the contrary, it is strengthened and reinforced at the point where it passes through the wall of the tub. Furthermore, it is not necessary to provide a long thread in order to secure the necessary in and out adjustment, such as is the case when the thread is formed on the pipe. Also and for the same reason, no thread is left exposed on the inside of the tub, and a much more pleasing appearance results. In case of injury to the thread of a split sleeve, the latter may be removed and another one inserted, while if the thread was formed directly on the pipe, the entire fitting would be rendered worthless. The cost of forming the threads is also considerably reduced, by reason of the fact that the spud portion is difficult of access for the threading operation.

I also wish it to be distinctly understood that, by forming the thread on a split sleeve, instead of on the pipe proper, I am enabled to make the fitting from a single piece of pipe without any connections in the same whatsoever, either welded or soldered. This, I am enabled to do, because of the fact that it is not necessary to form the spud portion separate from the vertical portion of the fitting, in order to carry on the threading operation.

It will be understood that, in any construction in which the threads are formed directly on the spud portion of the fitting, the same must be of greater diameter than the remainder of the fitting, because the threads must, of necessity, extend out far enough to engage with the threads of a nut which can be slipped over the remainder of the fitting. This being the case, the spud portion must be formed separate from the remainder of the fitting, and, afterward, secured to the same as by soldering or welding, or else the spud portion must be cast or expanded out to a diameter greater than the remainder of the fitting. Expanding a pipe in this manner, tends to weaken it, and it will be seen that this weakening by expansion would take place at the very point, where the spud portion would be further weakened, by having the threads cut into it. A further disadvantage in forming the threads directly on the pipe is this, that they must be formed before the pipe is bent to form the fitting. Under these circumstances, there is great danger of injuring the threads in the bending process, and, consequently, the cost and difficulty of manufacture are increased very considerably. For the above reasons, it is seen that a peculiar relation exists between a fitting made entirely from a single piece of pipe and the split or removable sleeve construction. The above relation is particularly evident when considered in connection with a fitting which is made from bent pipe.

I claim:

1. In combination with the wall of a tub or the like, a fitting entered through the same, a threaded split sleeve on the fitting at the point where it passes through the wall, and a nut threaded on each end of the sleeve and gripping the wall between them, substantially as described.

2. In combination with the wall of a tub or the like, a fitting entered through the wall, an independent sleeve on the fitting at the point where the same passes through the wall, a nut threaded on the inner end of the sleeve and in engagement with the inner face of the wall, and provided with an inwardly extending flange for inclosing the end of the sleeve, and a nut or the like threaded on the sleeve and in engagement with the outer face of the wall to clamp the same against the first mentioned nut, substantially as described 3. In combination with the wall of a tub or the like, a fitting entered through the same, a threaded split sleeve on the fitting at the point where the same passes through the wall and of suitable length to extend through the wall and accommodate a clamping nut on each end, a nut threaded on the inner end of the sleeve and in contact with the inner face of the wall, and provided with an inwardly extending flange to inclose the end of the sleeve, and a nut threaded on the outer end of the sleeve and in engagement with the outer face of the wall, substantially as described.

4. A fitting of the class described, comprising a vertical leg, a spud portion, and a cock attachment, and having the spud portion bent upward with respect to the vertical leg to a suitable angle to permit the same to pass through the wall of a bath tub or the like at right angles, and having its cock connection suitably formed with respect to the spud portion to permit a cock to stand vertical within the tub, substantially as described.

5. In combination with the wall of a tub or the like, a fitting of the class described comprising a single piece of pipe, suitably formed to provide a connection from a point near the floor to and through the wall of the tub to the water cock, and of substantially the same size at the point where it passes through the wall as in its major portion, and suitably expanded at its inner end to accommodate the valve of a cock, and to provide a flange adapted to co-act with a nut for securing a connection to the water cock, a split sleeve on the pipe where it passes through the tub wall, threaded on its exterior surface, and a nut on each end of the split sleeve and clamping the wall of the tub between them, substantially as described.

JOHN M. McDONALD.

Witnesses:
Thomas A. Banning, Jr.,
Frances M. Frost.